(12) United States Patent
Ehigiato (10) Patent No.: US 12,128,746 B2
(45) Date of Patent: Oct. 29, 2024

(54) AUTOMOBILE COVER AND SNOW REMOVER

(71) Applicant: Idemudia Ehigiato, Hamden, CT (US)

(72) Inventor: Idemudia Ehigiato, Hamden, CT (US)

( * ) Notice: Subject to any disclaimer, the term of this patent is extended or adjusted under 35 U.S.C. 154(b) by 197 days.

(21) Appl. No.: 17/774,772

(22) PCT Filed: Nov. 6, 2020

(86) PCT No.: PCT/US2020/059449
§ 371 (c)(1),
(2) Date: May 5, 2022

(87) PCT Pub. No.: WO2021/092413
PCT Pub. Date: May 14, 2021

(65) Prior Publication Data
US 2022/0396135 A1    Dec. 15, 2022

Related U.S. Application Data

(60) Provisional application No. 62/933,311, filed on Nov. 8, 2019.

(51) Int. Cl.
*B60J 11/04* (2006.01)

(52) U.S. Cl.
CPC ..................... *B60J 11/04* (2013.01)

(58) Field of Classification Search
CPC ....................................................... B60J 11/04
USPC ........................................................ 150/166
See application file for complete search history.

(56) References Cited

U.S. PATENT DOCUMENTS

| | | | | |
|---|---|---|---|---|
| 1,918,423 A * | 7/1933 | Persinger | ................. | B60J 11/02 296/136.03 |
| 2,688,513 A * | 9/1954 | Poirier | ..................... | B60J 11/02 296/136.03 |
| 4,973,100 A * | 11/1990 | Yang | ........................ | B60J 11/00 296/136.04 |
| 6,070,629 A * | 6/2000 | Whiteside | ................ | B60J 11/00 296/136.02 |
| 7,967,366 B1 * | 6/2011 | Tellez | ...................... | B60J 11/02 296/136.02 |
| 2010/0224124 A1 * | 9/2010 | Bush | ........................ | B60J 11/00 118/504 |
| 2018/0345058 A1 * | 12/2018 | Walker | .................... | A62C 8/06 |

* cited by examiner

*Primary Examiner* — Sue A Weaver
(74) *Attorney, Agent, or Firm* — Intellectual Property Consulting, LLC; Jared K. Rovira; Mark Melasky (57) ABSTRACT

In accordance with embodiments of the invention, an automobile cover is provided. The automobile cover includes an inner cover operable to envelope a vehicle and an outer cover attached to the inner cover. The outer cover is operable to cover the inner cover in a covered position. The outer cover includes a first opposing flap and a second opposing operable to overlap in the covered position and operable to be pulled from the covered position into an uncovered position. One or more straps are attached to the first opposing flap and operable to pull the first opposing flap from the covered position to the uncovered position. One or more straps are attached to the second opposing flap, said one or more straps operable to pull the second opposing flap from the covered position to the uncovered position.

14 Claims, 8 Drawing Sheets

AUTOMOBILE COVER AND SNOW REMOVER

CROSS REFERENCE TO RELATED APPLICATIONS

This application claims priority to International Patent Application No. PCT/US2020/59449, filed Nov. 6, 2020, and U.S. Provisional Patent Application No. 62/933,311, filed Nov. 8, 2019, the entirety of which are hereby incorporated by reference as if fully disclosed herein.

FIELD OF THE INVENTION

The present invention relates generally to automobile covers used to remove snow from vehicles. More specifically, this invention allows for easy and quick removal of snow from all surfaces of the vehicle without the need to scrape or brush the snow.

BACKGROUND OF THE INVENTION

Current products for removing snow from vehicles consist of scraping and/or brushing devices. The user generally works in the cold for several minutes scraping and brushing snow and/or ice from areas of the vehicle reachable by the user, often leading to an incomplete removal. This is a laborious and cumbersome process which is susceptible to damaging the paint of the vehicle.

Other products attempt to solve the problem by covering parts of the vehicle, usually the front windshield, side mirrors, and/or top, and are then removed from the vehicle, removing snow from the partially covered areas. These products are limited in function, as snow is not removed from all the surfaces of the vehicle, including the hood, trunk, rear windshield, and vertical surfaces. Accordingly, what is needed is an automobile cover that will effectively remove snow from all areas of a vehicle with minimal effort from the user.

SUMMARY OF INVENTION

In accordance with embodiments of the invention, an automobile cover is provided. The automobile cover includes an inner cover operable to envelope a vehicle and an outer cover attached to the inner cover. The outer cover is operable to cover the inner cover in a covered position. The outer cover includes a first opposing flap and a second opposing operable to overlap in the covered position and operable to be pulled from the covered position into an uncovered position. One or more straps are attached to the first opposing flap and operable to pull the first opposing flap from the covered position to the uncovered position. One or more straps are attached to the second opposing flap, said one or more straps operable to pull the second opposing flap from the covered position to the uncovered position.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

For a further understanding of the nature and function of the embodiments, reference should be made to the following detailed description. Detailed descriptions of the embodiments are provided herein as well as the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

As used herein, homogeneous is defined as the same in all locations, and a homogeneous material is a material of uniform composition throughout that cannot be mechanically separated into different materials. Examples of "homogeneous materials" are certain types of plastics, ceramics, glass, metals, alloys, paper, board, resins, high-density polyethylene and rubber.

Figure 1:
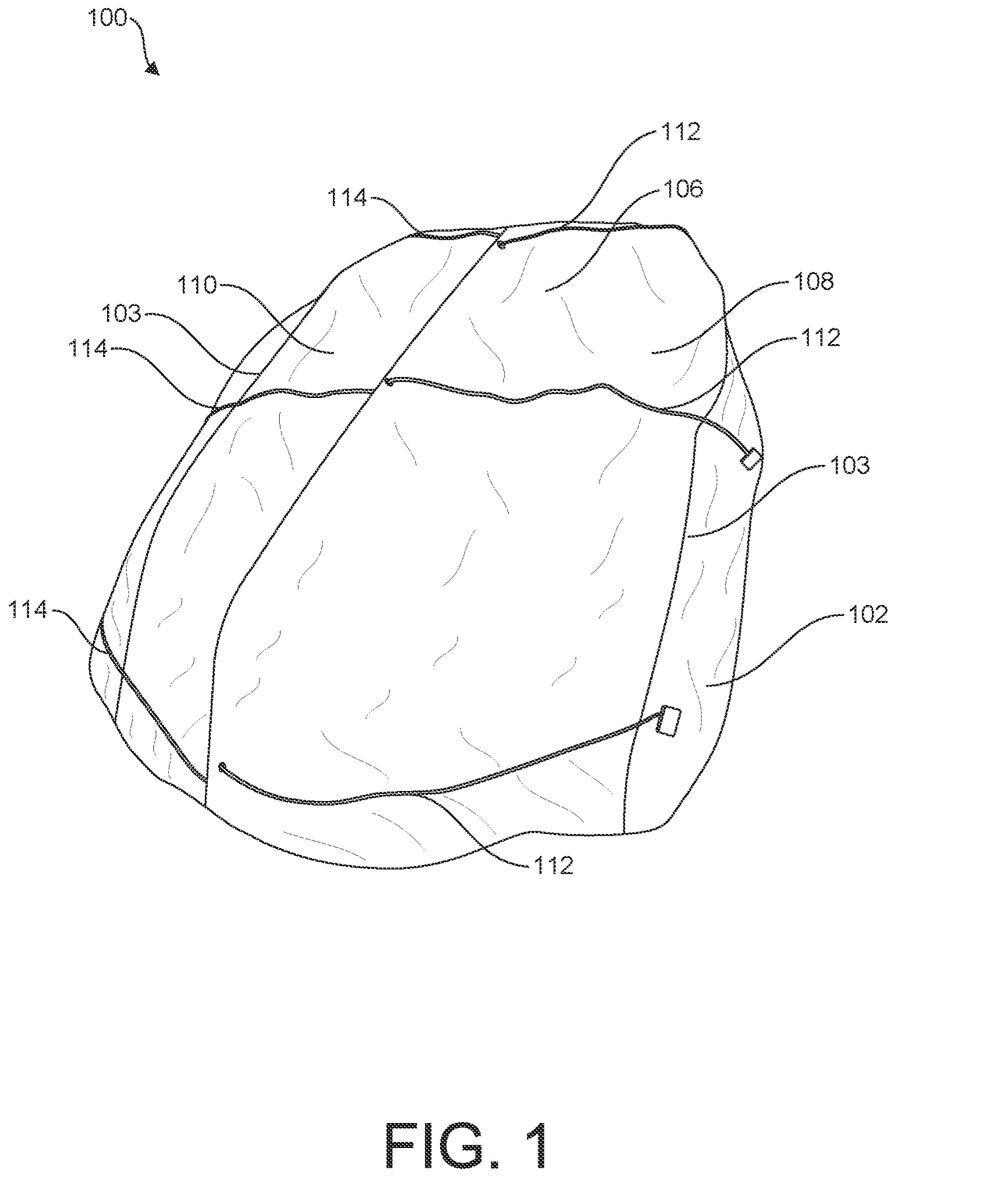
FIG. 1 illustrates a front right perspective view of an automobile cover in accordance with embodiments of the present invention.
Figure 2:
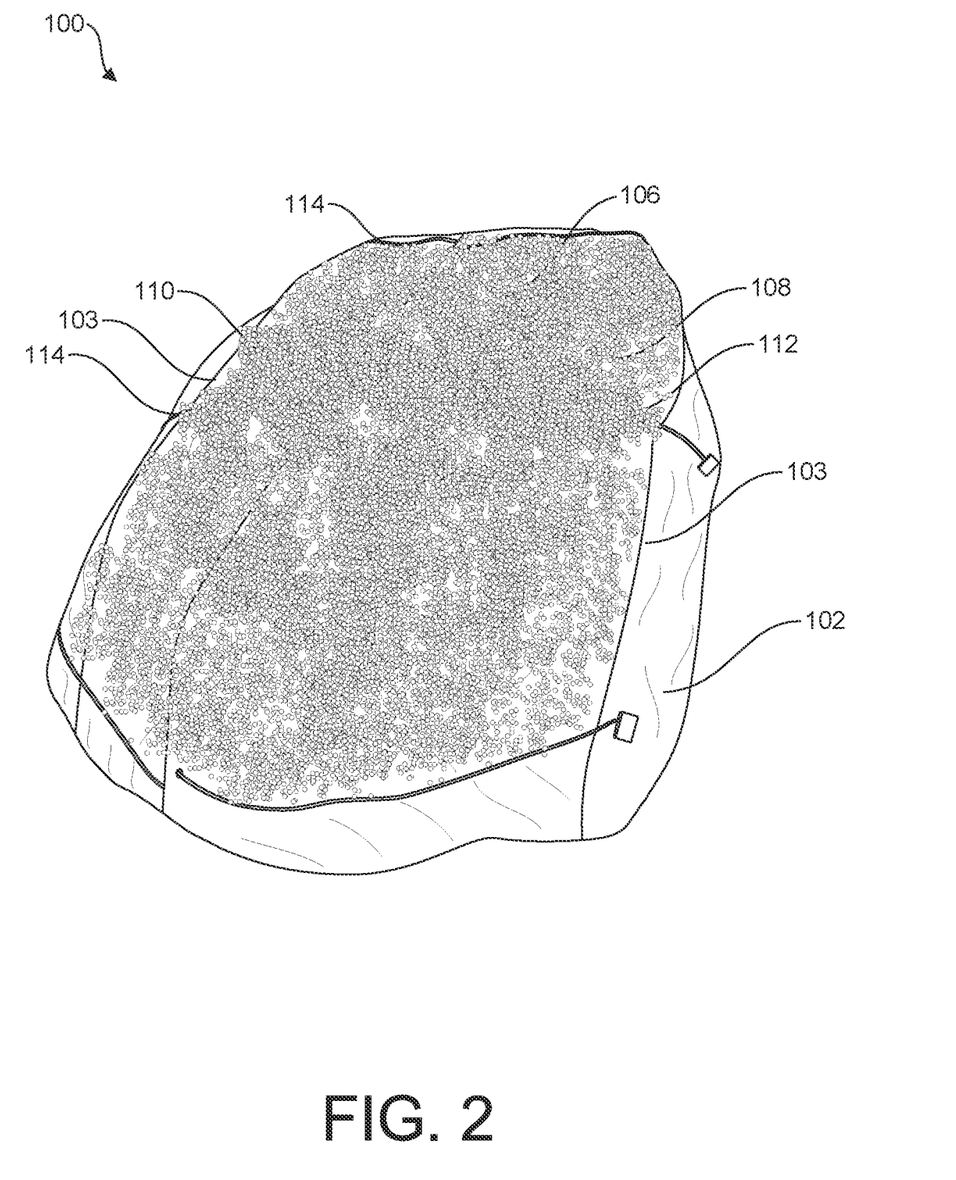
FIG. 2 illustrates a front right perspective view of an automobile cover with snow in accordance with embodiments of the present invention.
Figure 3:
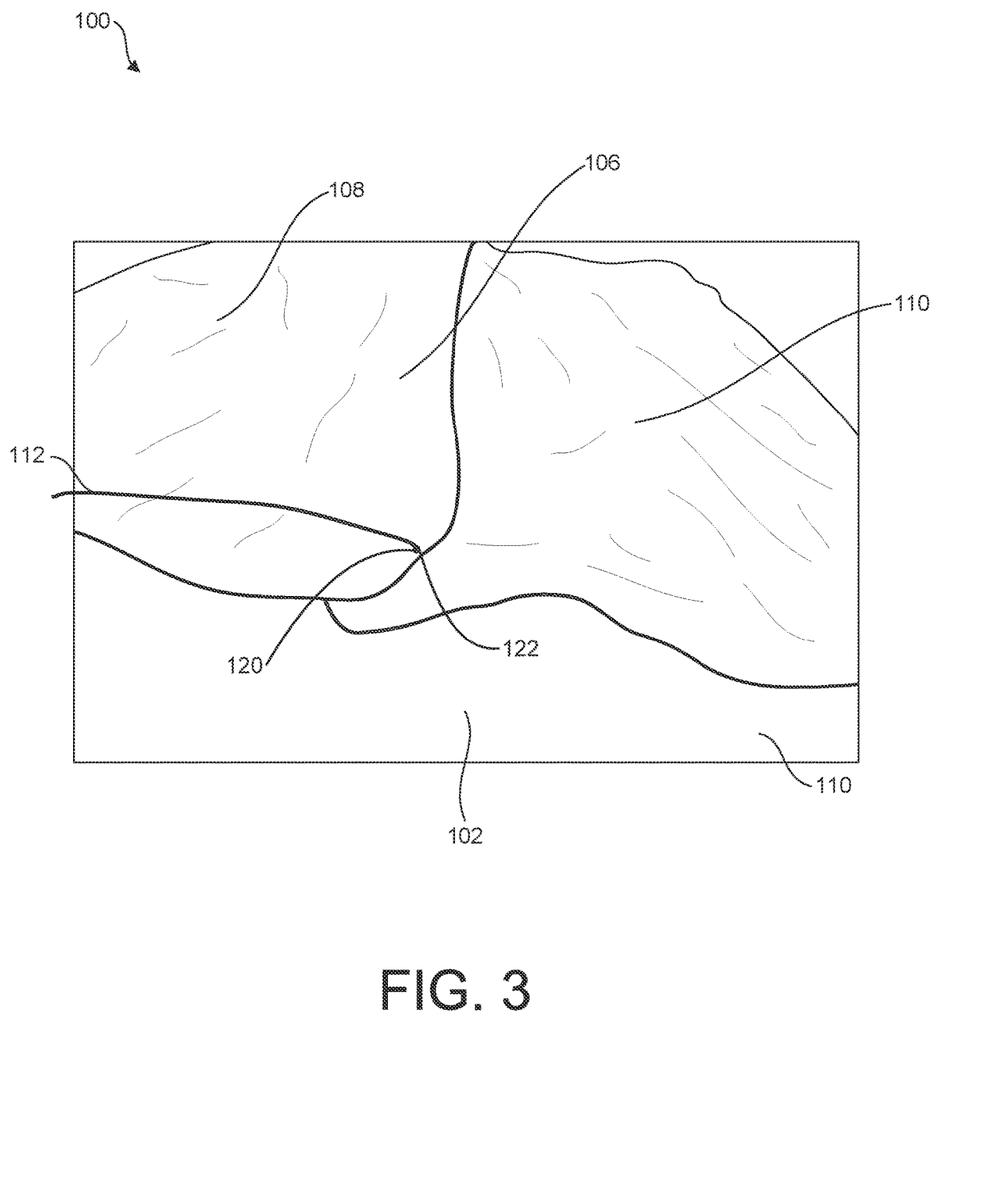
FIG. 3 illustrates a rear view of overlapping flaps of an automobile cover in accordance with embodiments of the present invention.
Figure 4:
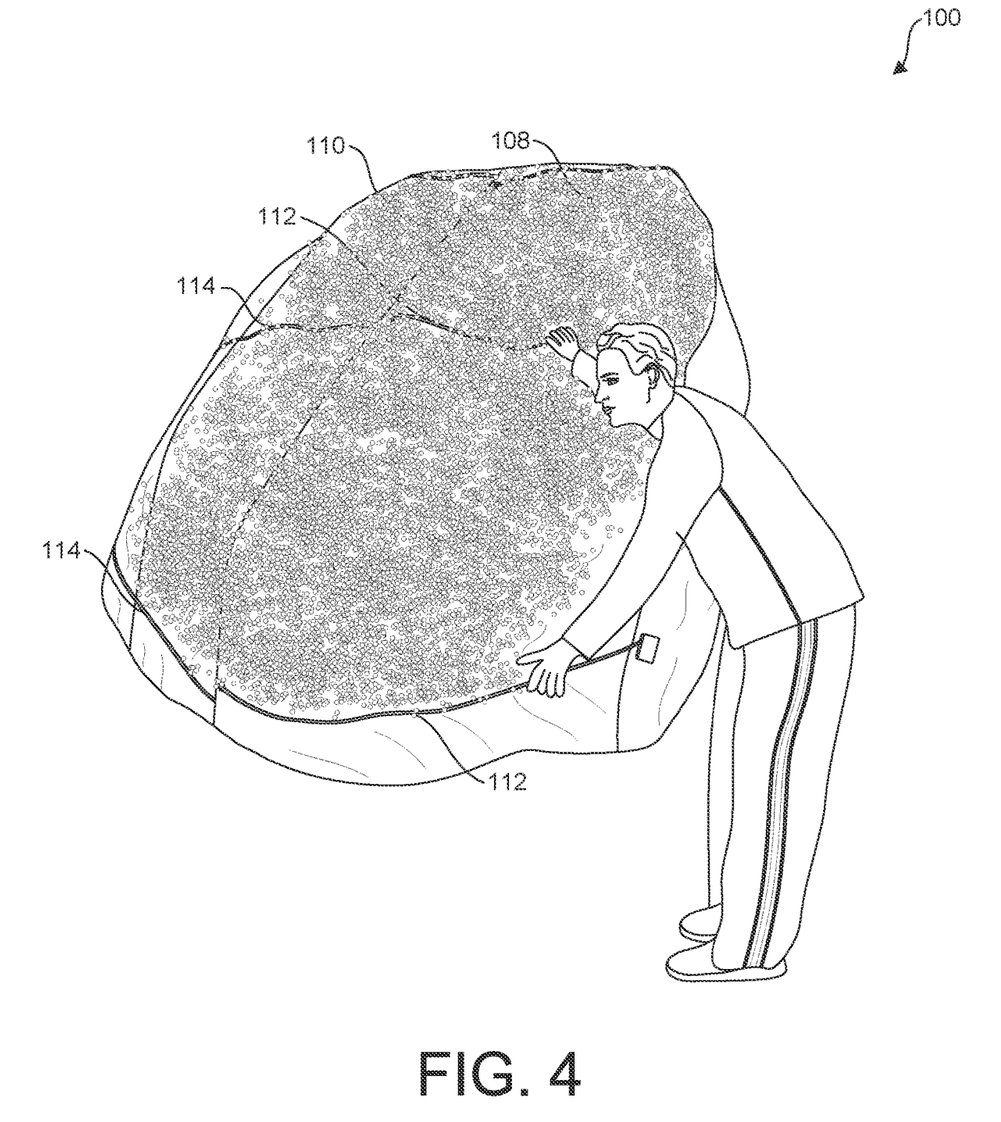
FIG. 4 illustrates a front right perspective view of an automobile cover with a user positioned to remove the flaps of the automobile cover with a layer of snow from a car in accordance with embodiments of the present invention.
Figure 5:
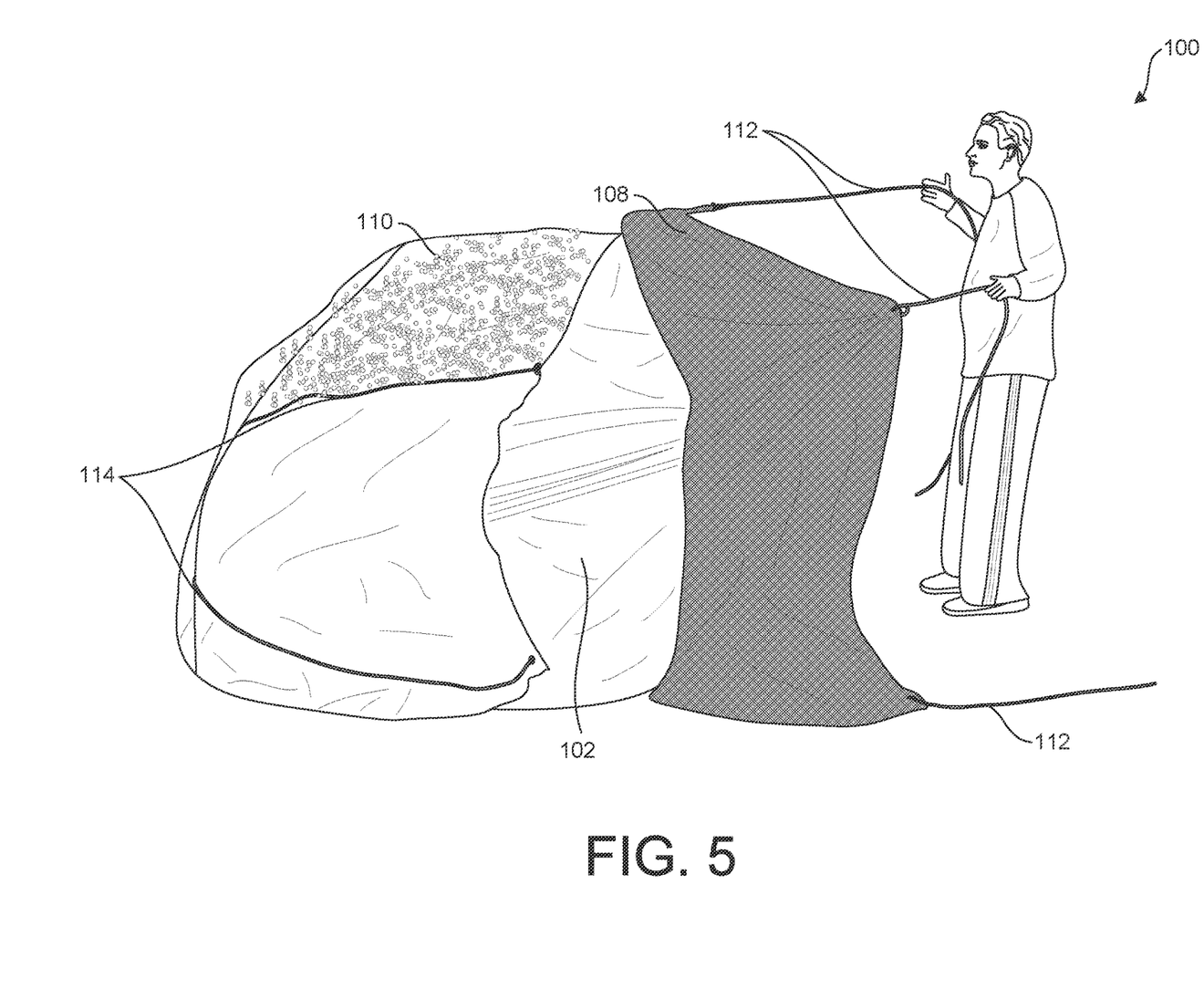
FIG. 5 illustrates a front right perspective view of an automobile cover with a user positioned to remove the flaps of the automobile cover from a car in accordance with embodiments of the present invention.
Figure 6:
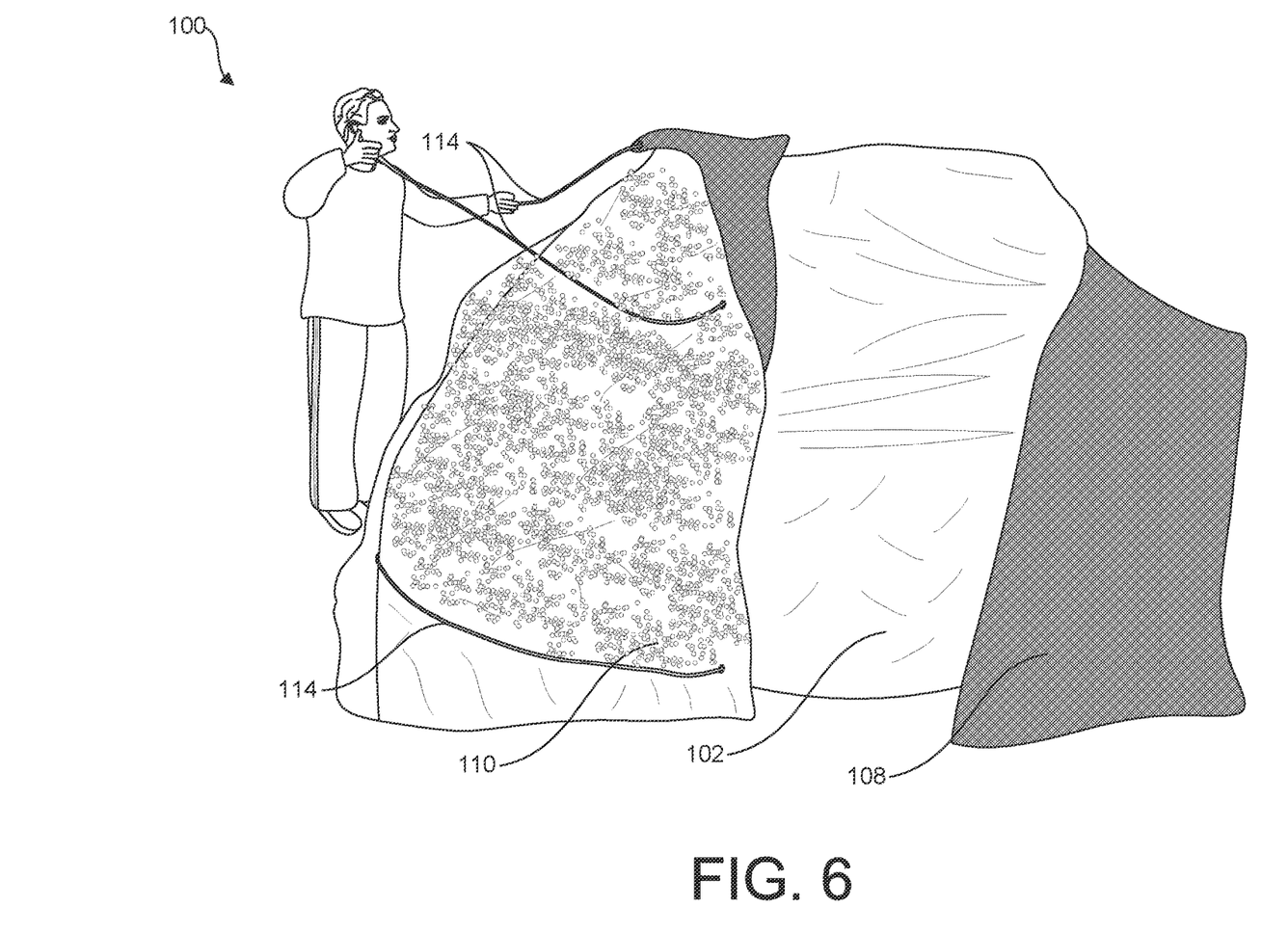
FIG. 6 illustrates a front right perspective view of an automobile cover with a user positioned to remove the flaps of the automobile cover from a car in accordance with embodiments of the present invention.
Figure 7:
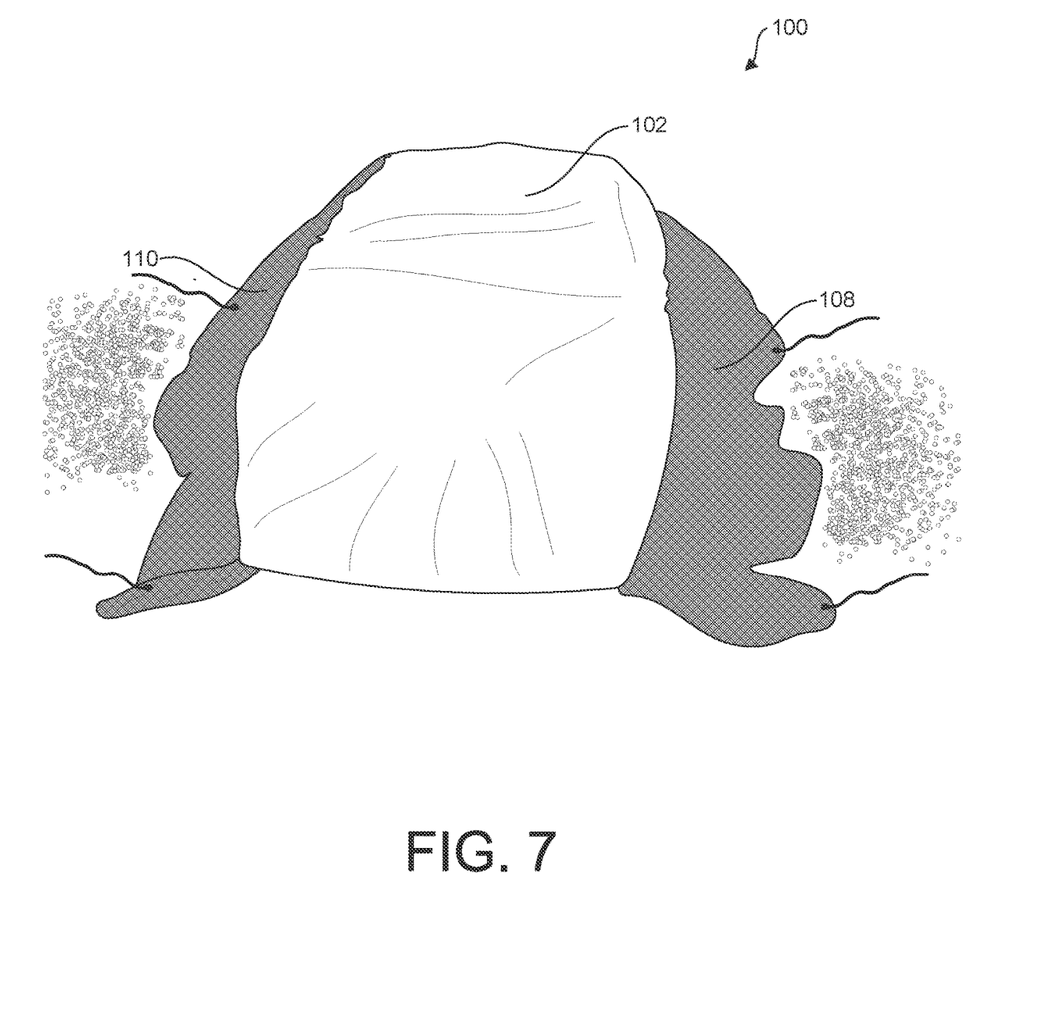
FIG. 7 illustrates a front right perspective view of an automobile cover with snow removed from the automobile and flaps in an open position accordance with embodiments of the present invention.
Figure 8:
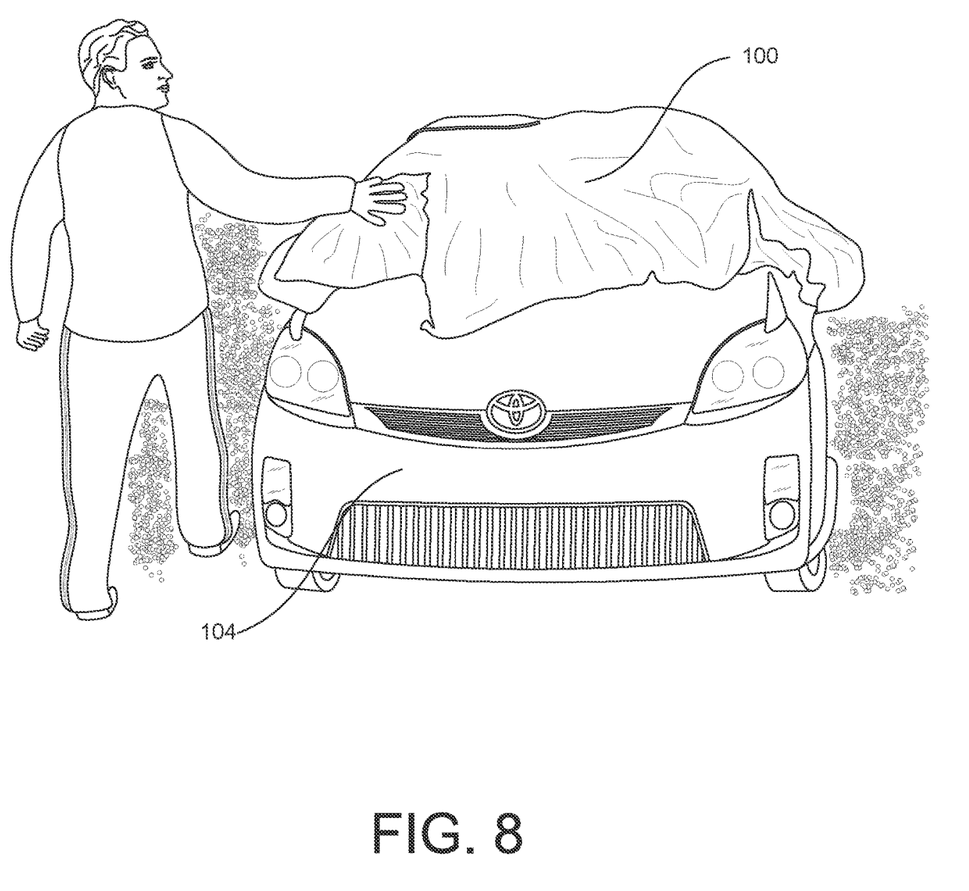
FIG. 8 illustrates a front right perspective view of an automobile cover being removed from a vehicle with snow removed from the automobile on the ground in accordance with embodiments of the present invention.

In accordance with embodiments of the invention, an automobile cover 100 is provided, as illustrated in FIGS. 1-8. The automobile cover 100 has an inner cover 102 operable to envelope a vehicle 104. An outer cover 106 is attached to the inner cover 102. The outer cover 106 may be attached to the inner cover 102 by sewing a seam 103. In some embodiments, adhesive, hook and loop fasteners, buttons, or other joining methods, for example, may be used for attaching the outer cover 106 to the inner cover 102. The outer cover 106 is operable to cover the inner cover in a covered position, as illustrated in FIGS. 1-4. The outer cover 106 comprises a first opposing flap 108 and a second opposing flap 110. The first opposing flap 108 and the second opposing flap 110 are operable to overlap in the covered position. The first opposing flap 108 and the second opposing flap 110 are further operable to be pulled from the covered position into an uncovered position, as illustrated in FIGS. 5-7. As illustrated in the Figures, the first opposing flap 108 and the second opposing flap 110 may open along the length of the vehicle 104. However, in one embodiment, the flaps may open along the width of the vehicle 104, for example. In one embodiment, the opposing flaps 108 and 110 comprise a plurality of flaps per side, enabling a user to remove only a portion of snow accumulated on top of the vehicle.

One or more straps 112 are attached to the first opposing flap 108, enabling the straps 112 to pull the first opposing flap 108 from the covered position to the uncovered position. One or more straps 114 are attached to the second opposing flap 110, enabling the second straps 114 to pull the second opposing flap 110 from the covered position to the uncovered position. As illustrated in the Figures, the pluralities of straps 112 and 114 are positioned incrementally along the length of the vehicle, enabling a user to pull on adjacent straps and remove snow progressively along the vehicle 104, as illustrated in FIGS. 4-5. The straps 112 and 114 may be made from high tension ropes, chains, or straps, for example. In one embodiment, the straps 112 and 114 are straps attached to the flaps 108 and 110 by sewing or adhesive, for example. In embodiment, the straps 112 and 114 are ropes attached to the flaps 108 and 110 through a hole 120, as illustrated in the Figures. A grommet 122 may reinforce the hole 120, for example. In another embodiment, the automobile cover 100 may not include straps 112 and 114, wherein a user would pull directly on the flaps 108 and 110 to remove snow from the vehicle 104. A leak-proof storage bag may be attached to the automobile cover or a separate component to store the automobile cover 100.

In one embodiment, an inner cover 102 envelops all the surfaces of the vehicle 104. The outer cover 106 has a split in the center that runs from rear to front and right to left at both ends of the vehicle 104. The split may be connected by a hook and loop device, magnets, or other joining methods, for example. Straps are placed at strategic points for the user to pull on when removing snow from the vehicle. The automobile cover 100 may be configured to cover snowmobiles, ATVs, grills, patio furniture, military vehicles, and other apparatuses that may be exposed to outdoor elements, such as keeping electric vehicles warm in cold climates and keeping vehicles cool as a sunshade in warm climates.

In one embodiment, a protective cover with high tensile strength is operable to cover all the surfaces of the vehicle. The cover may have a split in the center that runs from rear to front and right to left at both ends of the vehicle, or several splits that run from side to side that can be operated by standing on one side of the vehicle. The split may be joined together with a hook and loop device, or magnets, or other joining methods, for example. Straps are placed at strategic points for the user to pull on when removing snow from the vehicle.

In operation, the user pulls on the straps 112 and 114 to open the cover 100 and remove snow from the vehicle 104 starting from one end and working their way around the vehicle, as illustrated in FIGS. 4-8. When the snow is removed, the user may temporarily tack the cover back in a few areas with the hook and loop, remove the cover and stow in a water-resistant bag, for example. The bag may be placed in the vehicle or stored elsewhere. Any remaining snow that is placed in the bag is melted by heat from the vehicle and collected in the water-resistant bag. The user can then remove the water at a later time. The protective cover may also be used to protect the vehicle from the elements such as snow, rain, sun, UV rays, dirt, debris, dust, and sand for example.

Embodiments of the invention provide a number of advantages over the prior art, including: the automobile cover 100 does not require scraping or brushing snow from the vehicle; the automobile cover 100 removes snow from all surfaces of vehicle 104 not just the windshields and side mirrors; eliminates potential of paint damage, as scraping or brushing is not required; can be used in lieu of a regular car cover by protecting vehicle from the elements such as snow, rain, UV, sun, bugs, debris, and sand for example; and installation and snow removal can be accomplished quickly, in as little as a few minutes, enabling owners to spend less time in the cold removing snow from vehicles. The use of high-tension ropes or straps enables a gradual removal of snow by pulling one or two ropes at a time, thereby reducing the amount of snow that the user pulls at once and thus resulting in a lower amount of force required to remove the snow. The present invention is operable for use on vehicles equipped with roof racks. The ropes or straps allow the user to gradually pull and lift the snow as opposed to the traditional method of sliding a heap of snow on the vehicle. In some embodiments, ropes or magnets are not required for attachment to the vehicle, thus reducing the amount of time for installation and removal.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An automobile cover, comprising:
    an inner cover operable to envelope a vehicle;
    an outer cover attached to the inner cover, said outer cover operable to cover the inner cover in a covered position, said outer cover comprising a first opposing flap and a second opposing flap, wherein said first opposing flap overlaps a portion of said second opposing flap in the covered position, and said first opposing flap and said second opposing flap are operable to be pulled from the covered position into an uncovered position;
    one or more straps attached to the first opposing flap, said one or more straps operable to pull the first opposing flap from the covered position to the uncovered position; and
    one or more straps attached to the second opposing flap, said one or more straps operable to pull the second opposing flap from the covered position to the uncovered position.

2. The automobile cover of claim 1, further comprising a plurality of straps connected to the first opposing flap and the second opposing flap.

3. The automobile cover of claim 1, wherein the outer cover is attached to the inner cover by a seam.

4. The automobile cover of claim 1, wherein the straps are made from ropes.

5. The automobile cover of claim 1, wherein the straps are made from straps.

6. The automobile cover of claim 1, wherein the straps are attached to the flaps by sewing or stitching.

7. The automobile cover of claim 1, wherein the straps are ropes and said straps are attached to the flaps through a hole.

8. The automobile cover of claim 7, wherein the hole is reinforced with a grommet.

9. The automobile cover of claim 1, further comprising a leak-proof storage bag operable to store the automobile cover.

10. The automobile cover of claim 1, wherein the flaps overlap along a length of the vehicle.

11. The automobile cover of claim 1, wherein the flaps overlap along a width of the vehicle.

12. An automobile cover, comprising:
    an inner cover operable to envelope a vehicle; and
    an outer cover attached to the inner cover, said outer cover operable to cover the inner cover when the outer cover is in a covered position, said outer cover comprising a first opposing flap and a second opposing flap, wherein said first opposing flap overlaps a portion of said second opposing flap in the covered position, and said first opposing flap and said second opposing flap operable to be pulled from the covered position into an uncovered position.

13. An automobile cover, comprising:
    an inner cover operable to envelope a vehicle; and
    an outer cover attached to the inner cover, said outer cover operable to cover the inner cover when the outer cover is in a covered position, said outer cover comprising a flap, said flap operable to cover the inner cover in the covered position, and said flap operable to be pulled from the covered position into an uncovered position.

14. The automobile cover of claim 13, further comprising one or more straps attached to the flap, said straps operable to pull the flap from the covered position to the uncovered position.

* * * * *